US009251553B2

(12) United States Patent
Rao et al.

(10) Patent No.: US 9,251,553 B2
(45) Date of Patent: Feb. 2, 2016

(54) DUAL CONTROL OF A DYNAMICALLY RECONFIGURABLE PIPELINED PRE-PROCESSOR

(71) Applicant: Analog Devices, Inc., Norwood, MA (US)

(72) Inventors: Satishchandra G. Rao, Bangalore (IN); Boris Lerner, Sharon, MA (US); Robert Bushey, Medfield, MS (US); Michael Meyer-Pundsack, Egenburg (DE); Benno Kusstatscher, Munich (DE); Sreejith Kazhayil, Bangalore (IN); Gokul Muthusamy, Bangalore (IN); Gopal Karanam, Bangalore (IN); Praveen Sanjeev, Kerala (IN)

(73) Assignee: Analog Devices, Inc., Norwood, MA (US)

( * ) Notice: Subject to any disclaimer, the term of this patent is extended or adjusted under 35 U.S.C. 154(b) by 367 days.

(21) Appl. No.: 13/651,427

(22) Filed: Oct. 14, 2012

(65) Prior Publication Data
US 2013/0101053 A1    Apr. 25, 2013

Related U.S. Application Data

(60) Provisional application No. 61/547,442, filed on Oct. 14, 2011.

(51) Int. Cl.
*G06F 15/16* (2006.01)
*G06T 1/20* (2006.01)
*H04N 19/85* (2014.01)

(52) U.S. Cl.
CPC . *G06T 1/20* (2013.01); *H04N 19/85* (2013.01)

(58) Field of Classification Search
CPC .............................. G06F 13/18; G06F 13/1663
USPC ...................................... 345/501–506; 712/32
See application file for complete search history.

(56) References Cited

U.S. PATENT DOCUMENTS

| 5,784,640 | A | 7/1998 | Asghar et al. |
| 5,798,770 | A | 8/1998 | Baldwin |
| 6,188,381 | B1 | 2/2001 | van der Wal et al. |
| 6,658,578 | B1 * | 12/2003 | Laurenti et al. ............... 713/324 |

(Continued)

FOREIGN PATENT DOCUMENTS

| WO | WO-9401824 A1 | 1/1994 |
| WO | WO-9735244 A2 | 9/1997 |

(Continued)

OTHER PUBLICATIONS

Vijverberg J. A. et al. "Two-dimensional aystolic-array architecture for pixel-level vision tasks", Proceedings of SPIE, vol. 772408, May 4, 2010, pp. 772408_1-772408_7.

(Continued)

*Primary Examiner* — Weiming He
(74) *Attorney, Agent, or Firm* — Patent Capital Group

(57) ABSTRACT

A pipelined video pre-processor includes a plurality of configurable image-processing modules. The modules may be configured using direct processor control, DMA access, or both. A block-control list, accessible via DMA, facilitates configuration of the modules in a manner similar to direct processor control. Parameters in the modules may be updated on a frame-by-frame basis.

24 Claims, 11 Drawing Sheets

(56) References Cited

U.S. PATENT DOCUMENTS

| | | | |
|---|---|---|---|
| 7,088,860 | B2 | 8/2006 | Matsugu et al. |
| 7,149,811 | B2 | 12/2006 | Wise et al. |
| 7,924,878 | B2 | 4/2011 | Schmidt |
| 7,974,471 | B2 | 7/2011 | Matsuno |
| 2006/0067592 | A1* | 3/2006 | Walmsley et al. ............ 382/303 |
| 2008/0059764 | A1 | 3/2008 | Stefan |
| 2010/0135383 | A1 | 6/2010 | Zhao et al. |
| 2012/0290756 | A1* | 11/2012 | Damodaran et al. .......... 710/244 |

FOREIGN PATENT DOCUMENTS

| | | |
|---|---|---|
| WO | 2008/027567 | 3/2008 |
| WO | WO-2008027567 A2 | 3/2008 |
| WO | WO-2009035185 A1 | 3/2009 |

OTHER PUBLICATIONS

Adario A M S et al. "Dynamically Reconfigurable Architecture for Image Processor Applications", Design Automation, 1999, 1999. 36th Annual Conference on New Orleans, LA, USA Jun. 21-25, 1999, Piscataway, NJ, USA, IEEE, Jun. 21, 1999, pp. 623-628.

Hayat L. et al. "A dynamically reconfigurable parallel pipelined system for real-time image processing application", Jan. 1, 1991, pp. 6/1-6/4.

Hayat L. et al. "An efficient multidimensional/multidirectional parallel pipelined architecture for image processing", Digital Processing of Signals in Communications, 1991, Sixth International Conference on Loughborough, UK, London, IEEE, UK, Jan. 1, 1991, pp. 105-110.

International Search Report and Written Opinion issued for International Application No. PCT/US2012/060159 on Jan. 15, 2013 and mailed on Jan. 24, 2013.

U.S. Appl. No. 13/651,426, filed Oct. 14, 2012.

Non-Final Office Action for U.S. Appl. No. 13/651,426 mailed Nov. 28, 2014, 19 pages.

U.S. Appl. No. 13/651,428, filed Oct. 14, 2012.

Non-Final Office Action for U.S. Appl. No. 13/651,428 mailed Nov. 24, 2014, 20 pages.

U.S. Appl. No. 13/651,429, filed Oct. 14, 2012.

Extended European Search Report for European Patent Application Serial No. 14164566.3 mailed Jun. 3, 2014, 8 pages.

Response to Extended European Search Report for European Patent Application Serial No. 14164566.3 filed Dec. 22, 2014, 12 pages.

* cited by examiner

DUAL CONTROL OF A DYNAMICALLY RECONFIGURABLE PIPELINED PRE-PROCESSOR

CROSS-REFERENCE TO RELATED APPLICATIONS

This application claims priority to and the benefit of U.S. Provisional Patent Application Ser. No. 61/547,442, filed on Oct. 14, 2011, which is hereby incorporated herein by reference in its entirety.

BACKGROUND

A stream of video frames, such as that generated by a video camera or read from a memory, frequently requires processing to improve the quality of the video or to extract features from the video. This processing is traditionally done by software in a post-processing operation. The post-processing operation may vary because (i) the parameters/coefficients of the algorithmic processing modules need to be modified; (ii) fine variations of a given algorithm need to be performed; and/or (iii) the operations that need to be performed on the video need to be changed. A software solution, however, while versatile, is slow and expensive in terms of processing power. Hardware-based algorithms are typically faster and more efficient, but hardware, by its nature, is difficult to reconfigure quickly and easily, especially when it must keep pace with live, streaming video. Existing hardware-based image processing systems thus produce non-optimal results because of their limitations in flexibility. A need therefore exists for a fast, efficient, and reconfigurable hardware-based image-processing system.

SUMMARY

In one embodiment of the current invention, a pipelined video pre-processor ("PVP") is made up of several algorithmic transformation image-processing modules that may be connected to each other in a variety of different, customizable configurations. Each of these modules has a plurality of parameter registers that control finite variations of a given algorithm implementation. The parameters of the modules may be re-configured on a frame-by-frame basis with no loss of data, and the configuration of modules may be changed with minimal or no loss of data. The parameters may be changed via a connected processor, via DMA access, or both simultaneously. The differing control schemes are designed to be compatible with each other, ensuring seamless transitions between them.

In one aspect, a system for configuring modules in a pipelined pre-processor includes a first input port for receiving a first control signal from a processor and a second input port for receiving a second control signal from a memory. An arbitration unit resolves a conflict between the first and second control signals. A controller decodes the first and second control signals and applies configuration parameters derived therefrom to the modules.

An interface (e.g., an advanced peripheral bus ("APB") interface) may be used to decode the first control input. The first control signal may be a memory-mapped register ("MMR") input, and the second control signal may be received from one or more direct-memory access ("DMA") channels. The first control signal may control a first subset of the modules and, simultaneously, the second control input may control a second subset of the modules. A module may be controlled by both the first and second control signals. A shadow register may receive one of the decoded first and second control signals. The shadow register may write an application register in at least one module to thereby apply the configuration parameters to the module. The arbitration unit may stall the second control signal in the event of a conflict.

In another aspect, a method for configuring modules in a pipelined pre-processor includes receiving a first control signal from a processor and a second control signal from a memory. A conflict is resolved between the first and second control signals. The first and second control signals are decoded, and configuration parameters derived therefrom are applied to the modules.

A shadow register may be filled with information derived from one of the first or second control signals. A module may be configured in accordance with the contents of the shadow register. The first control signal may be ignored during configuring of the module. The second control signal may be stalled in the event of a conflict. The second control signal may be received from one or more DMA channels. The first control signal may control a first subset of the modules and, simultaneously, the second control input may control a second subset of the modules. A module may be controlled by both the first and second control signals.

In another aspect, a pipelined video pre-processor having configurable modules in a digital-signal processor includes a first input port for receiving a first control signal from the digital-signal processor and a second input port for receiving a second control signal from a memory. An arbitration unit resolves a conflict between the first and second control signals. A controller decodes the first and second control signals and configuration parameters derived therefrom are applied to the modules. The first control signal may be an MMR input and the second control signal may be a DMA input.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
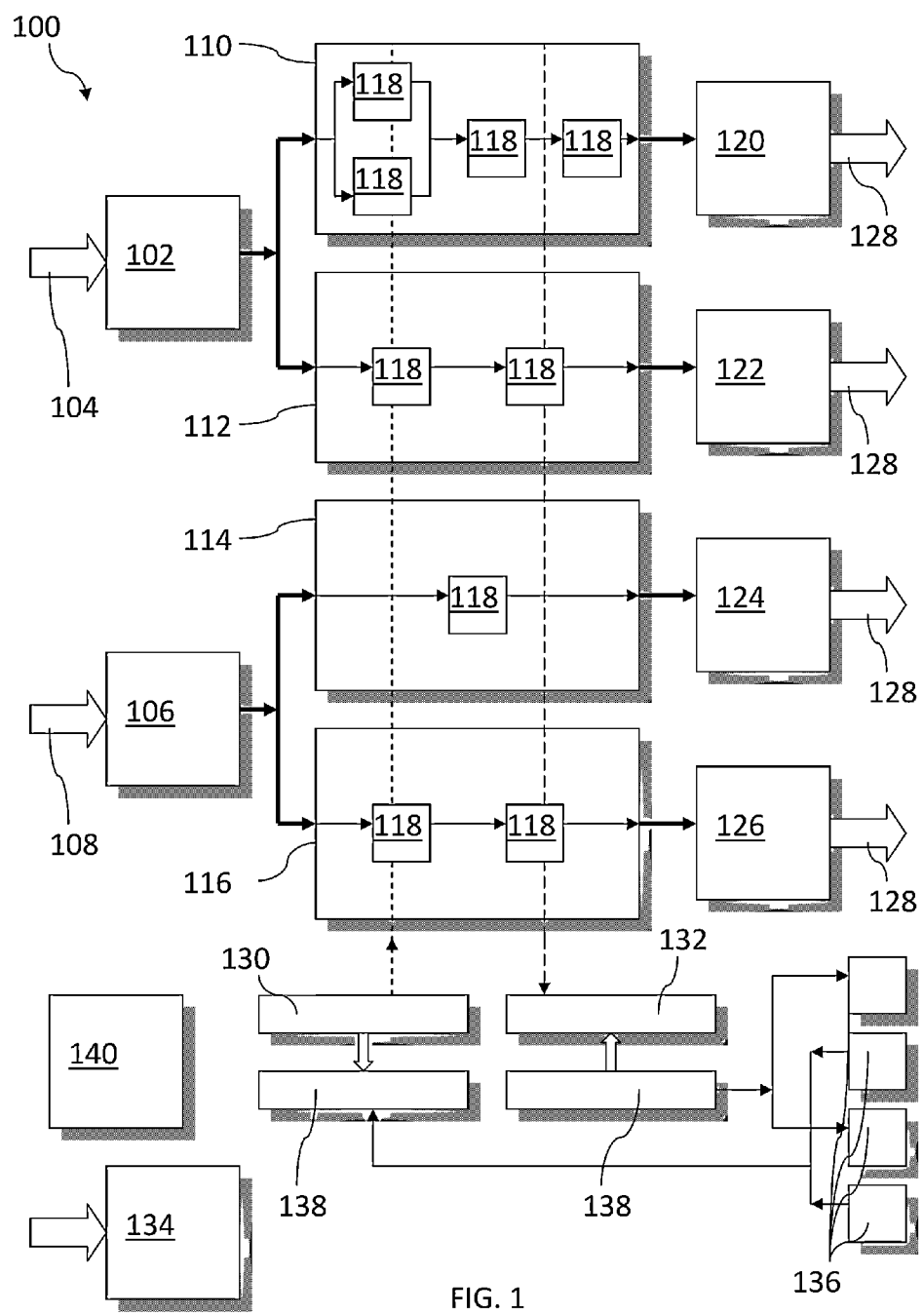
FIG. 1 is a block diagram of a PVP in accordance with an embodiment of the present invention.

FIG. 1 illustrates an embodiment of a pipelined video pre-processor ("PVP") 100. The PVP may operate on any incoming data; in one embodiment, the data is video image data captured from a camera sensor and/or video image data fetched from a memory. The PVP may be placed on a stand-alone silicon chip; in other embodiments, the PVP is placed on a chip along with a processor, such as a digital-signal processor. A first input-data formatter 102 may be used to format incoming camera data 104 from a camera source, and a second input-data formatter 106 may be used to format memory data 108 from a memory source. Data from one or more sources may be processed simultaneously. The present invention is not limited to any particular number or kind of input sources, and the input data sources may include one or more camera sources 104 and/or one or more memory sources 108. Each source 104, 108 may be received by its own input-data formatter 102, 106 or may share input-data formatters 102, 106 with other sources 102, 104.

The input-data formatters 102, 106 output formatted input data to one or more reconfigurable pipelines 110, 112, 114, 116. Each pipeline 110, 112, 114, 116 contains one or more processing modules 118. As explained in greater detail below, the processing modules 118 perform a variety of different image-processing functions and tasks and may be selected and configured in accordance with a desired image-processing result. The number of modules 118 per pipeline, the order of the modules 118 within the pipeline, and the configuration of the modules 118 within a pipeline may be reconfigured as necessary, and a given module 118 may be selected for use in different pipelines 110, 112, 114, 116. FIG. 1 illustrates four modules 118 in the first pipeline 110 (two modules 118 being configured to operate in parallel), two modules 118 in the second pipeline 112, one module 118 in the third pipeline 114, and two modules 118 in the fourth pipeline 116. This configuration of modules is presented as only one possible configuration of the PVP 100, however, and one of skill in the art will understand that many other configurations are possible.

The outputs of the pipelines 110, 112, 114, 116 are received by output-data formatters 120, 122, 124, 126, which prepare the output data (by, for example, compressing or packing it) and send it off-chip via output ports 128. In one embodiment, the output-data formatters 120, 122, 124, 126 are connected via peer-to-peer connections to dynamic-data exchange ("DDE") modules used for connection with a bus protocol (e.g., an AXI bus). In one embodiment, each pipeline 110, 112, 114, 116 has its own output-data formatter 120, 122, 124, 126; in other embodiments, one or more pipelines 110, 112, 114, 116 may share a single output-data formatters (via use of, for example, a multiplexer to select between the pipelines).

Each module 118 may have internal configuration parameters that are controlled by an outside source. Each module 118 may have its own set of local parameter registers that determine the nature of processing offered by that module within the confines of a given algorithm; additional parameter registers may be common to some or all of the modules 118. The parameter registers may include application registers 130 and/or status registers 132; only one set of these registers is shown for illustrative purposes, but each module 118 may contain its own set of application 130 and status 132 registers.

As explained in greater detail below, the parameter registers may be read or written by a variety of sources, including a connected processor (via an interface 134, such as an advanced peripheral bus or "APB" interface) or via direct-memory access ("DMA") though the use of input and output modules 136. In one embodiment, control and status information is input and output via the use of shadow registers 138; the shadow registers 138 read and write to the application registers 130 and/or status registers 132 in accordance with the timing of image data currently moving through a pipeline 110, 112, 114, 116 so that, for example, a first set of parameters is applied to a first frame in the pipeline and a second set of parameters is applied to a second frame in the pipeline. An image-pipe controller 140 may be used to coordinate control of the modules 118, as explained in greater detail below.

In various embodiments, the modules 118 may include a convolution/down-scaler engine ("CNV"); a pixel-magnitude and angle-computation unit ("PMA"); a threshold, histogram and compression engine ("THC"); an arithmetic computation unit ("ACU"); a pixel-edge classifier ("PEC"); an integral image computation ("IIM"); and/or an up-down scaler ("UDS"). One of skill in the art will understand that other modules may be included and that the present invention is not limited to only these modules. The modules 118 may be selectively connected to each other to create one or more different pipelines using any method known in the art such as, e.g., a programmable crossbar switch. In one embodiment, illustrated in FIG. 2, the modules 118 may be configured using multiplexers placed between them. In the system 200 shown in FIG. 2, a first module 202 having three output ports and a second module 204 having one output port are connected via a system of multiplexers 206 to a third module 208 having two input ports (and three output ports). By controlling the select lines 210 of the multiplexers 206, the third module 208 may receive any of the outputs of the first 202 and second 204 modules as either of its two inputs 212. The select lines 210 may be configured via processor or DMA control, in a manner similar to the configuration of other module parameters. One of skill in the art will understand that other configurations for the multiplexers 206 are also within the scope of the invention.

Any given module may be moved across the camera pipe and/or memory pipe as part of the pipe reconfiguration. The camera pipes may work on the pixel clock and the memory pipe may work on the system clock; both clocks may be asynchronous with respect to each other. The PVP architecture may ensure proper synchronization across clock domains so that a module may be switched between the pipes.

1. Control of Modules from Multiple Sources

In one embodiment, the image-processing modules in the PVP may be accessed by a linked processor via, for example, memory-mapped registers ("MMRs") accessible via an APB interface (such as the interface 134 shown in FIG. 1). A hardware interrupt may be asserted, for example, and the processor may read and write status and control information to and from the PVP and its modules. Once the processing modules are appropriately configured, the flow of image data may be dictated either by the processor or by a DMA engine.

In another embodiment, the image-processing modules may be configured by either or both of the APB interface (i.e., via the processor) and one or more DMA interfaces. In one embodiment, all of the processing modules are controlled at a first point in time by direct processor control and, at a second point in time, by DMA control. In another embodiment, a first subset of the modules is configurable by direct processor control while, simultaneously, a second subset is configurable by DMA control. For example, in the PVP, the first subset of modules may be modules that process data stored in a memory (i.e., a memory pipe) and the second subset may be modules that process data coming from a camera sensor (i.e., a camera pipe). In another embodiment, there may be a plurality (e.g., two or more) separate DMA control channels. A first DMA control channel may control the first subset of modules and a second DMA control channel may control the second subset of modules. For example, the first DMA control channel controls the camera pipe and the second controls the memory pipe. One of skill in the art will understand that other combinations of read and write control are possible and that the current invention is not limited to any particular division of direct and DMA control.

In one embodiment, direct or DMA control of the registers is accomplished by reading or writing first to a set of scratch registers; once these scratch registers are fully written, for example, their contents are then applied to the actual application registers. Likewise, reading of the control registers may first fill one or more scratch registers, and then the scratch registers are read via DMA control. The scratch registers may be the shadow registers 130, 132 shown in FIG. 1. In one embodiment, direct processor control by the APB interface is not allowed during loading or unloading of the shadow registers (i.e., during the time the contents of the shadow registers are being applied to the application registers or during the time the status registers are filling the shadow registers).

Figure 3A:
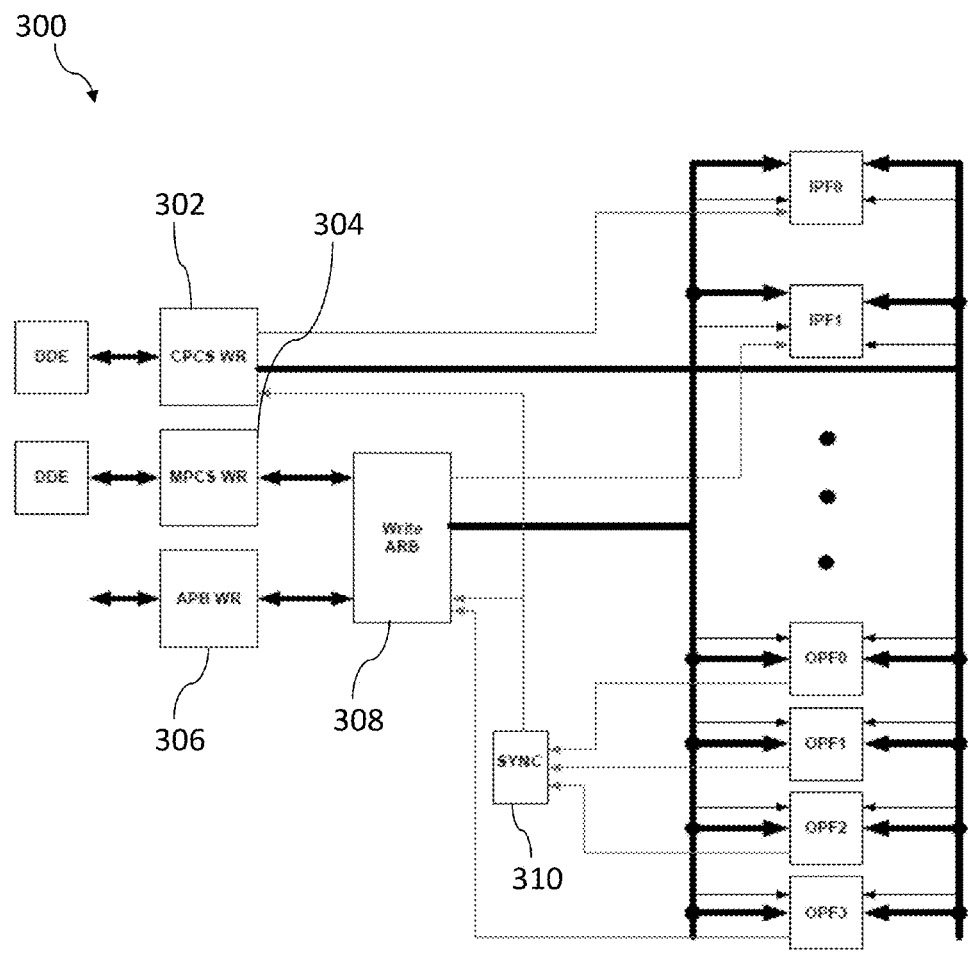
FIGS. 3A and 3B are implementations of an arbitration scheme in accordance with an embodiment of the present invention.
Figure 3B:
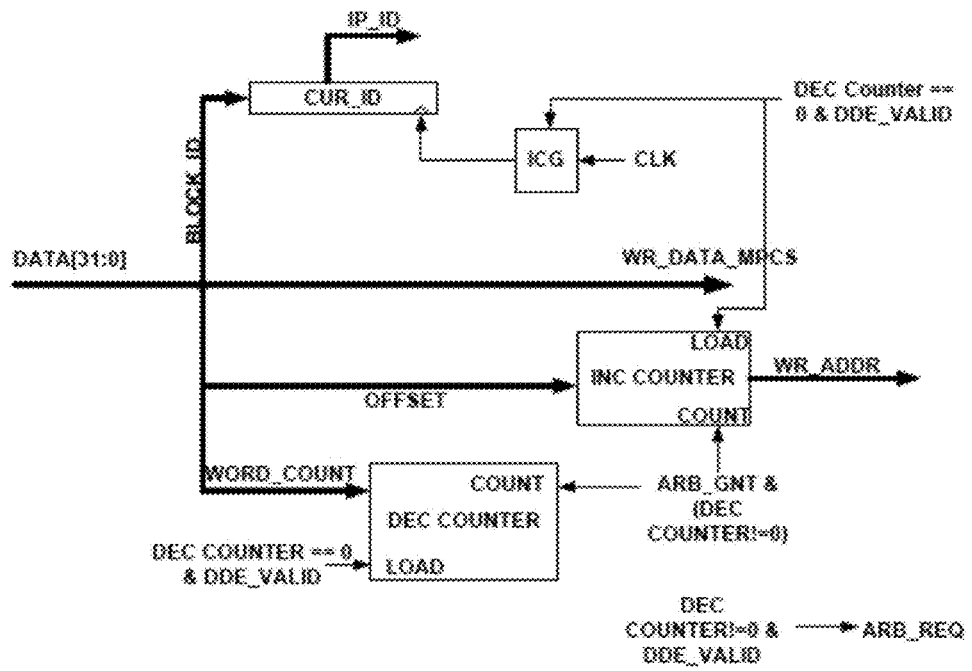

Because control of the modules may come from different sources, conflicts may arise between multiple simultaneous requests. In one embodiment, arbitration may be used to resolve conflicts between the different control mechanisms. FIG. 3A illustrates an illustrative arbitration scheme 300 in accordance with an embodiment of the invention. In this embodiment, a first DMA channel 302 is used to configure modules in a camera pipeline; modules in a memory pipeline may be configured using either a second DMA channel 304 or an APB link 306 for direct control by a processor. An arbitration unit 308 is used to resolve conflicts between the second DMA channel 304 and the APB link 306. The arbitration unit 308 may include a stall or blackout mechanism to delay access to the DMA engine during some or all of its loading phase and/or error signaling to thereby safeguard the validity of any simultaneous accesses by the APB link 306. In one embodiment, the arbitration module 308 interfaces with the DMA engine 304 and the APB link 306 and controls how the control data is programmed/arbitrated to the image-processing modules. In one embodiment, the arbitration module 308 is incorporated into the image-pipe controller ("IPC") 140, shown in FIG. 1, and communicates with the DMA engine and processor via P2P and APB buses, respectively. The image-processing modules may use an internal bus, such as an AHB bus. One embodiment of an implementation of the arbitration logic is shown in FIG. 3B.

The clock controlling some or all of the image-processing modules may be on a different domain than that of the clock domain of the DMA and processor interfaces. In this case, the clocks may be synchronized across the different domains. In one embodiment, subsets of the image-processing modules are arranged in a plurality of different-length pipes, and data may finish processing in a shorter pipe (and, e.g., assert a load_done signal to indicate completion) before it finishes processing in a longer pipe. A synchronization module 310 may delay synchronization of the early data until the later data is also available by, for example, receiving a load_done signal from each of the pipelines and sending a synchronization signal to the arbitration unit 308 when some or all of the load_done signals have been received.

The bits of the parameter registers may be set or cleared by the processor using polling or interrupts. In one embodiment, DMA status channels may be used to scan out one or more values in the parameter registers. For example, a histogram status may be scanned out, from the THC module, on the DMA status channel. The trigger of the DMA status channel may be based on a vsync output at a given module. If two statuses are requested over the same channel, an identifying field (e.g., numbers or letters) may be included in a status header for each module's status, and the two statuses may be sequenced, one after the other, after recording the event.

2. Programming through DMA

To facilitate control through DMA, a special control-word format called a block-control structure list ("BCL") may be defined in a system memory. The BCL is an array of control information intended for the application registers in the image-processing modules in the PVP; this control information is grouped by module, and each group contains header information (e.g., a block-control header or "BCH") instructing the PVP where and how to apply the control information. The BCL is read in via DMA, the header information is decoded by the image-pipe controller, and the control information is thereby applied to the modules. The structure of the BCL may allow a new module to be added easily by, e.g., appending or inserting a new module's BCH in the BCL.

Figure 4:
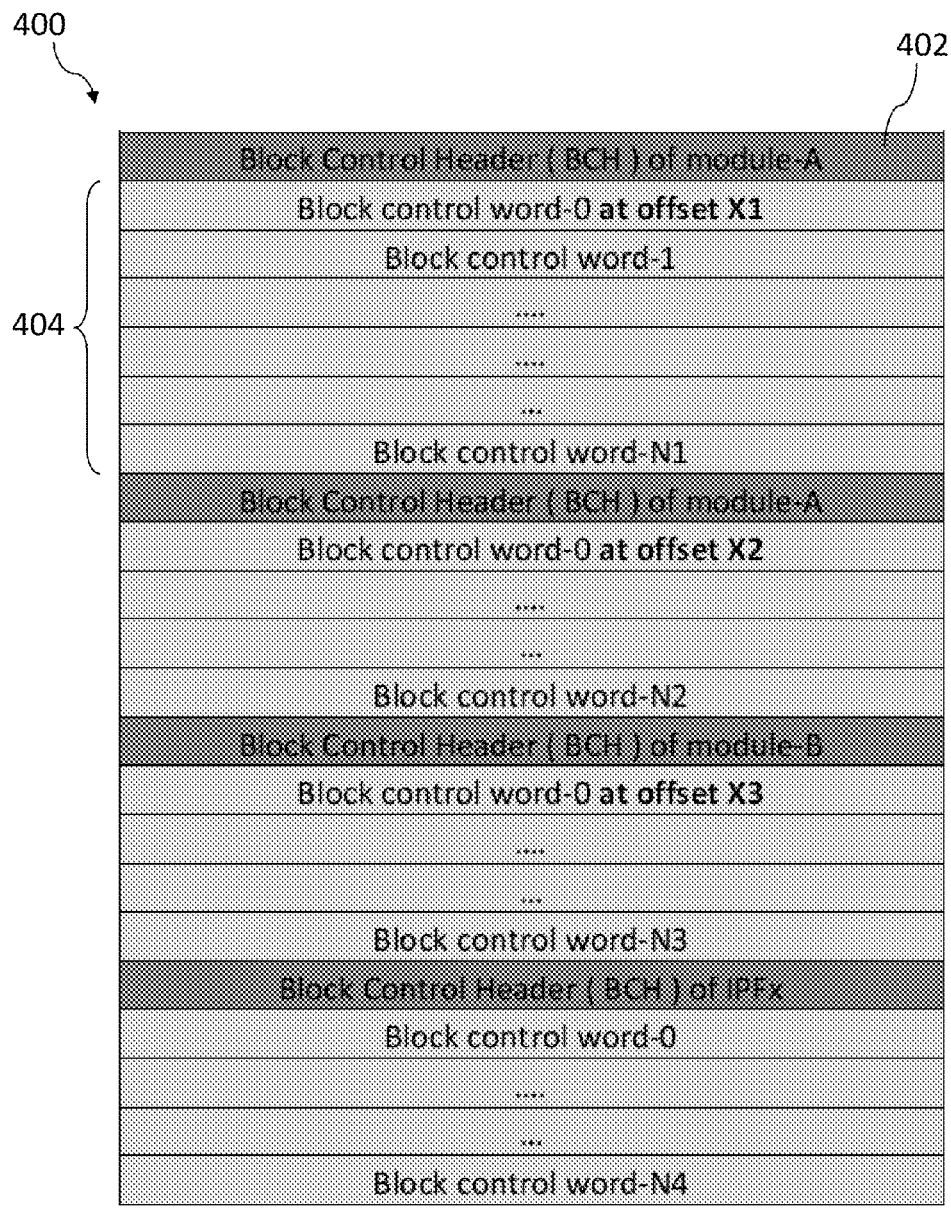
FIG. 4 is an illustration of a block-control list in accordance with an embodiment of the present invention.
Figure 5:
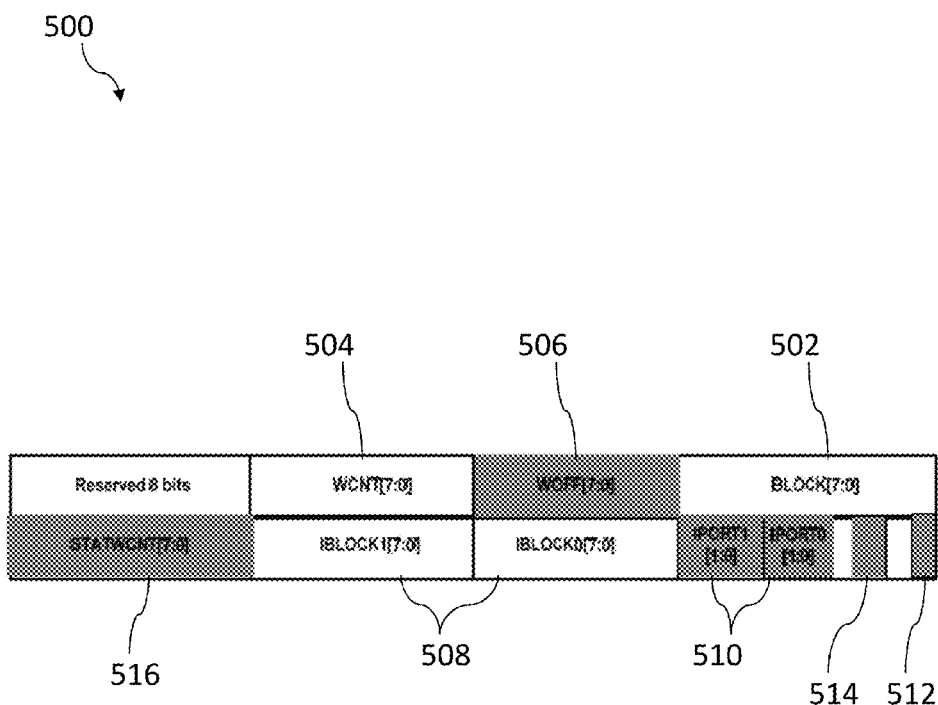
FIG. 5 is an illustration of a block-control header in accordance with an embodiment of the present invention.

FIG. 4 illustrates one embodiment of a BCL 400. A number of BCHs 402 are shown, each having an associated list of block-control words 404. FIG. 5 illustrates an expanded view of a BCH 500. A first field BLOCK 502 indicates a unique address assigned to each image-processing module in the PVP, and thereby instructs the image-pipe controller to which module to apply the parameters. A second field WCNT 504 indicates the number of control words contained in this block, thereby indicating the location of the next BCH. The use of the WCNT field may obviate the need for, for example, an end-of-block indicating field at the end of the block. Another field, WOFF 506, indicates an offset to be applied to the control words; for example, if a given module has a set of 256 registers, specifying an offset of 10 means that the control words are applied beginning at the tenth register. If WCNT is 12 (for example), registers 10 through 22 are programmed.

Figure 2:
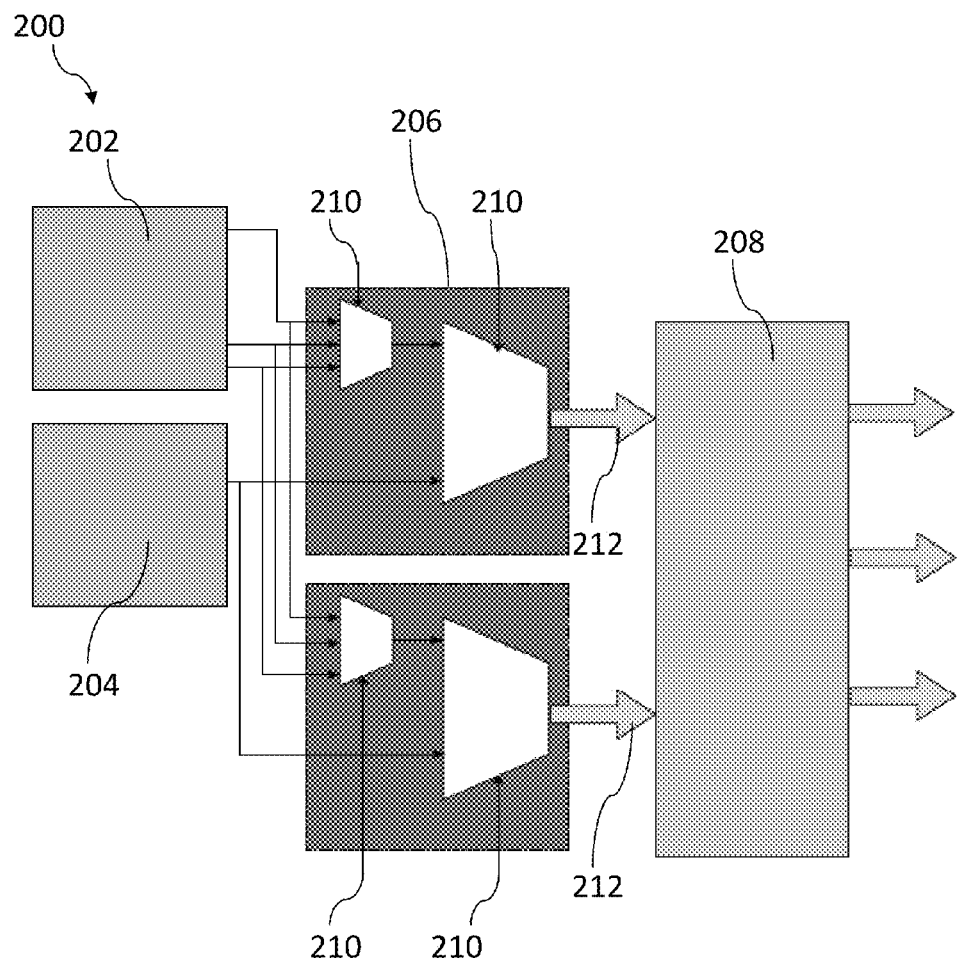
FIG. 2 is a block diagram of module configuration in accordance with an embodiment of the present invention.

Further fields in the BCH indicate how a module should be connected to upstream and downstream modules using, for example, the multiplexer control illustrated in FIG. 2. For example, IPORT fields 508 may be used to select a first level of multiplexers, and IBLOCK fields 510 may be used to select a second level of multiplexers. One of skill in the art will understand, however, that any other method of specifying multiplexer programming using select bits is within the scope of the current invention. Alternatively, all the IBLOCK(s) and IPORT(s) may be removed from the BCH and a separate crossbar-control header format (i.e., a crossbar-control structure or "CCS" packet) may be defined. Other fields include a START bit 512 that indicates whether a module should be enabled or disabled and a PIPE field 514 that indicates to which pipe a module should belong (i.e., a camera or memory pipe). Another field, STATWCNT 516, indicates how many status registers in a module should be read out in a read operation.

In one embodiment, a BCL for a given pipe begins with a configuration of an input-data format module, includes configuration of one or more image-processing modules, and ends with a configuration of an output-data format module.

The order of the configuration information for each image-processing module may correspond to the positions of the modules in the pipe. The BCH for a module may be repeated within a BCL (e.g., two or more times) to allow programming of two separate groups of registers for a given module inside a pipe. For example, a first BCH may be used to program registers 10-22 of a module, and a second BCH may be used to program registers 100-110 of the same module.

The configuration of the BCH for a given module may correlate to the direct processor control of the module via memory-mapped registers. For example, a given module may have a fixed base address for access via the processor; the BLOCK 502 identification number of the module (used for DMA control) may be derived from this base address. In one embodiment, the BLOCK 502 identification may be found by right-shifting the base address by five bits. Similarly, the difference between an actual MMR address and the base address may correlate directly to the WOFF offset field in the BCH. Thus, each control word in the BCL is arranged in the same order that they appear in the MMR address space, thereby simplifying the design of the BCH and of any software that configures the registers in the modules using either control scheme. For example, if a given register is 36 address units removed from the base address in the MMR address space, that same register is 36 units offset from the BLOCK 502 identification number in the DMA control scheme. Using this configuration, a programmer and/or software utility may seamlessly shift between the two control schemes without the use of, for example, a decoder/mapping utility to translate between the schemes.

Reading status via DMA is performed in a manner similar to writing control information through DMA. In one embodiment, module status values are moved into one or more shadow registers in accordance with the output capabilities of a given module (i.e., according to the clock rate of the module). The status information is then periodically sent via DMA in accordance with configuration registers (e.g., once every frame boundary or once every certain number of frames). The status information may be sent on a single DMA channel or simultaneously over multiple DMA channels. As explained above, a STATWCNT field 516 in the BCH indicates the number of status registers in a module to be read and sent.

3. Reprogramming Modules for Different Frames

For a given pipe configuration, embodiments of the present invention allow seamless reprogramming of parameter registers for modules comprising of any given pipe, such that back-to-back frames may be processed with different coefficients or variations of the algorithm provided by each module. A given module may have a latency of more than one clock cycle; the pipeline stages at the end of the module may, for example, be processing a first frame while the pipeline stages at the beginning of the module may be processing a second frame. The application registers that influence the behavior of the module may thus be updated at different times for each pipeline of the module to ensure that each frame is processed in accordance with its intended parameters. In one embodiment, the application registers in each pipeline are updated as a frame boundary propagates through the pipeline in the module. As described above, shadow registers may be used to update the application registers at the appropriate times; either the direct-processor MMR mechanism or the DMA control mechanism updates the shadow registers only, and the updating of the application registers is staggered in time.

The engine may control the granularity at which a given set of parameters or a given configuration is applied: continuously for every frame or for a fixed set of frames. Typically, the camera pipe continuously gets frames from the camera sensor, while the memory pipe receives fixed sets of frames; either mode may be used with either pipe, however. The processor may be switched from continuous mode to fixed mode (and vice versa) without disabling the entire PVP engine. To apply the parameters to every frame, a flag may be set (e.g., a frame count or "FCNT" value may be programmed to zero). If a new set of control values are programmed, the new values are be applied on the next frame boundary and applied to subsequent frames continuously thereafter. The architecture may also provide a TAG mechanism on a separate status DMA channel for ease of identification of the frames which have been processed with new control parameters; the processor may use this TAG mechanism to determine which frames received processing using a certain set of parameters. The TAG data may be sent on the status DMA channel and may also be available for processor read.

To apply the parameters to a fixed set of frames, the FCNT value may be programmed to a nonzero value and thereafter monitored. Once the predetermined number of frames has been processed, the pipeline halts (and the last frame is stuck in the pipeline). Once a next group of frames is identified and queued for processing, the FCNT value is set again, and the next group begins processing (with, perhaps, a different set of module parameters). Processing of the next group of frames pushes out the last frame of the previous set that was stuck in the pipeline.

The pipeline may be flushed if another parameter (e.g., a DRAIN bit) is set. If, for example, a finite set of frames is identified for processing and the DRAIN bit is set, upon completion of the last frame, the pipeline is flushed with dummy pixels so that the last frame in the set is output by the pipeline. As the last frame passes through the pipeline, the modules in the pipeline are disabled. In one embodiment, if the pipeline is in a continuous-frame mode and the DRAIN bit is set, the pipeline is immediately flushed and disabled. In either case, the next set of control words may be set to wake up the pipeline (by use of, for example, a START bit in the BCH of the frames).

Figure 6:
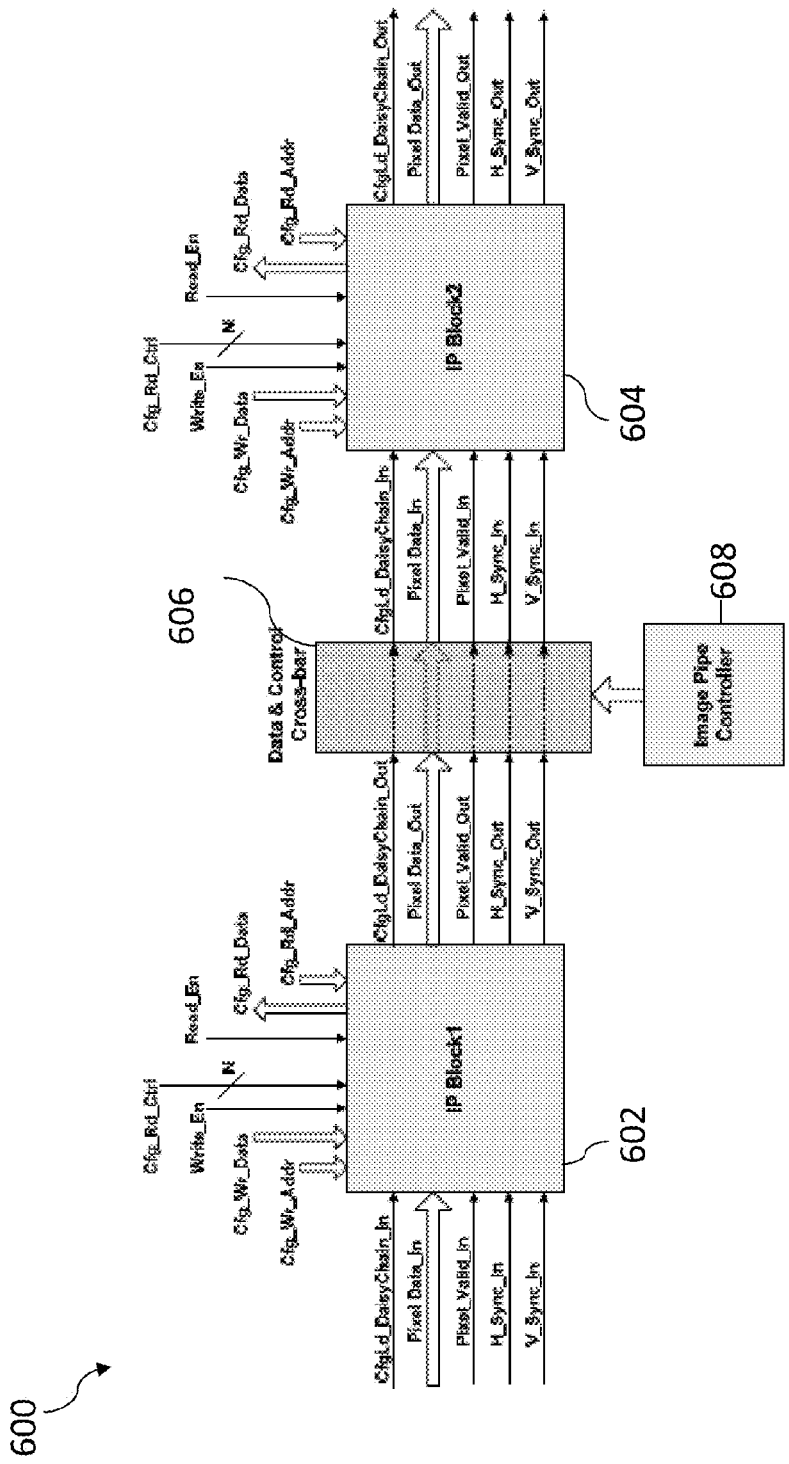
FIG. 6 is a block diagram of a frame-by-frame parameter update scheme in accordance with an embodiment of the present invention.
Figure 7:
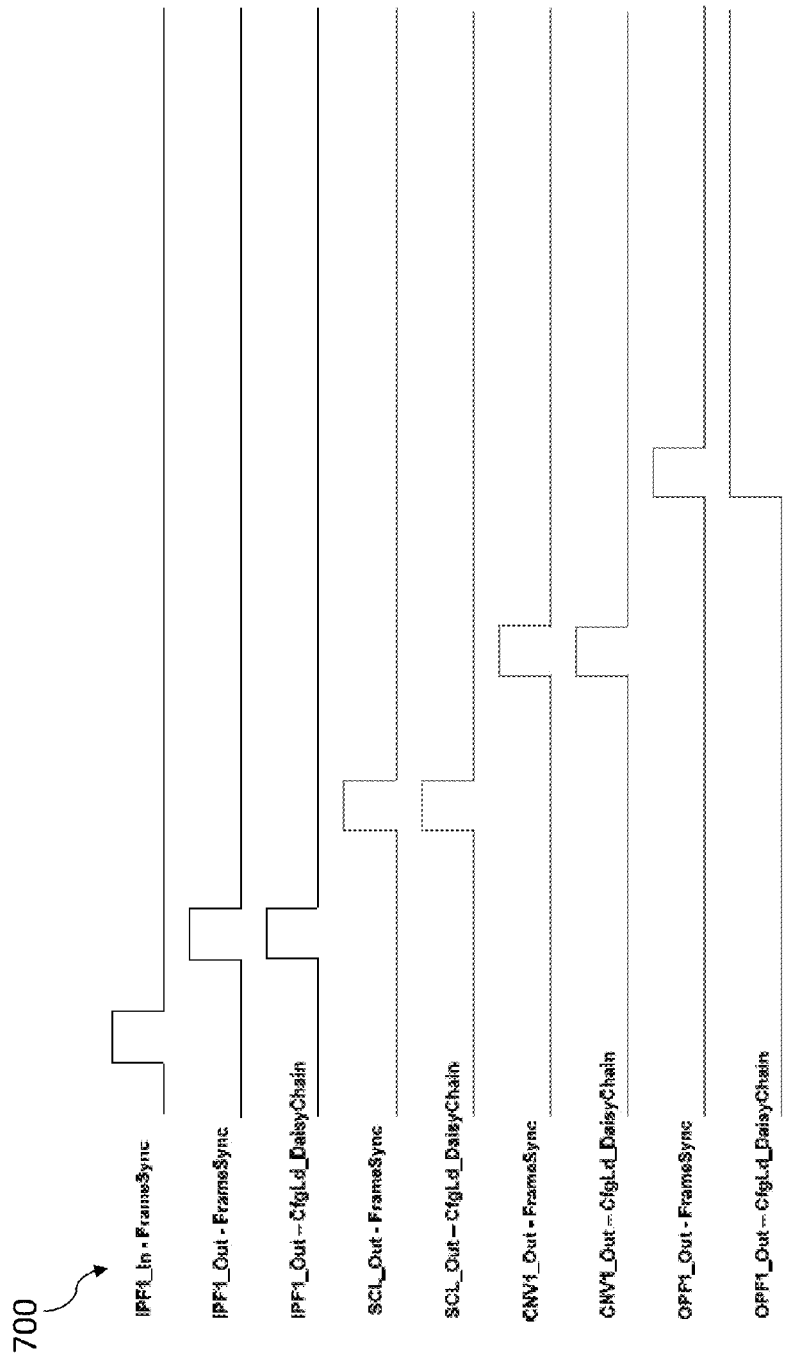
FIG. 7 is a timing diagram of frame-by-frame updating in accordance with an embodiment of the present invention.
Figure 8:
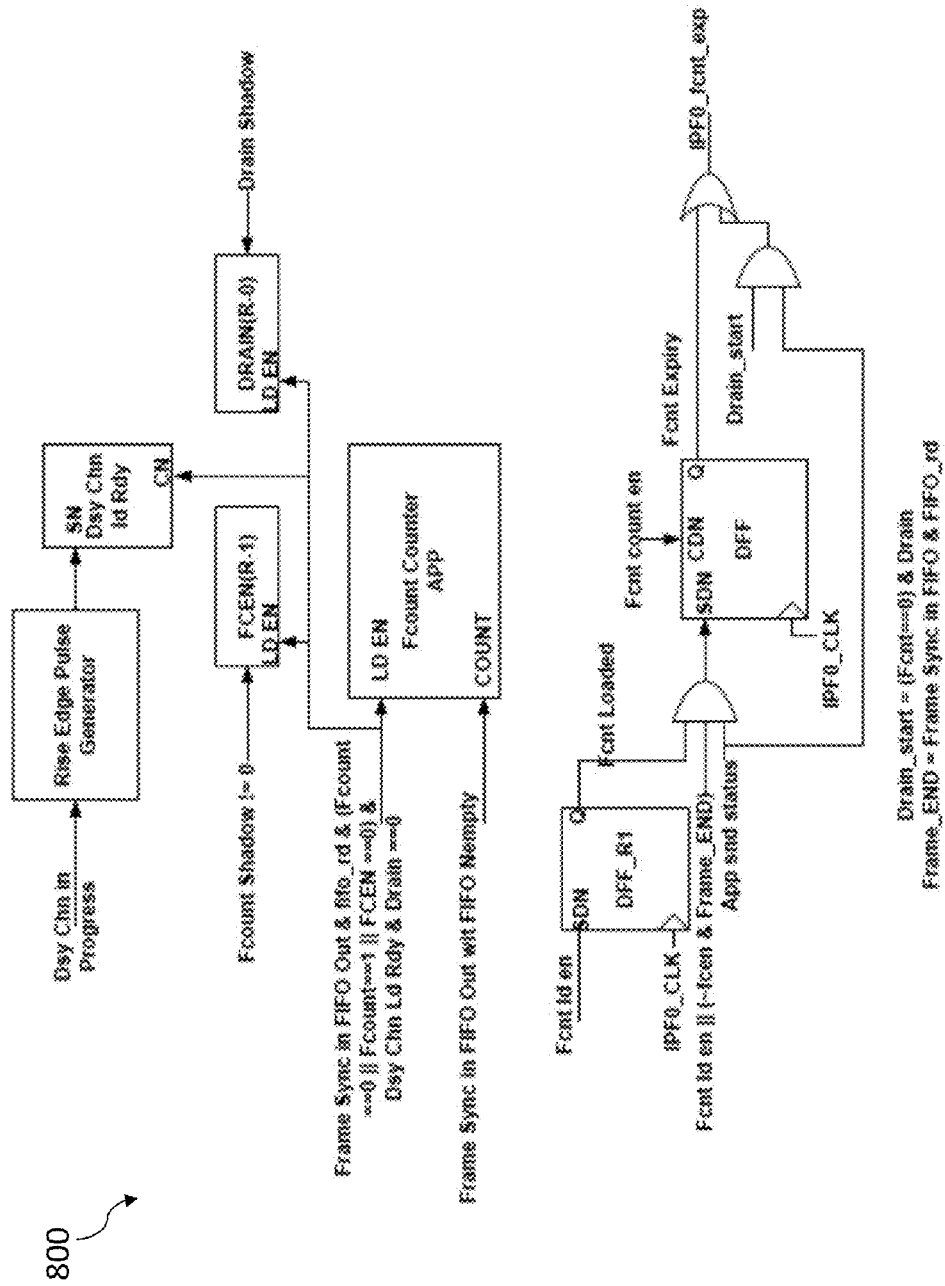
FIG. 8 a logic circuit 800 for gating the clocks and generating block reset in accordance with an embodiment of the present invention.

FIG. 6 illustrates an exemplary embodiment 600 of a first module 602, a second module 604, a data control and crossbar unit 606 connecting them, and an image-pipe controller 608. When a new set of application register values are loaded into the shadow registers either by DMA or direct-processor control, a "daisychainload" signal is driven together with a frame sync signal to the first module 602. The first module 602 updates its application registers in accordance with its internal pipeline delays as the first pixel in the input data passes through the module 602 (i.e., if the first module includes five pipeline stages, it applies the application-register values in turn to each of the five stages as the pixel data is processed through). When the first module 602 completes processing of the first pixel, it asserts the daisychainload signal on its output, thereby instructing the second module 604 to also begin applying the new application-register values (in accordance with its own pipeline configuration). A timing diagram 700 of the daisychainload signal and the frame sync signal is shown in FIG. 7, and FIG. 8 illustrates a logic circuit 800 for gating the clocks and generating block reset based on a drain_done and start bit.

In addition to reconfiguring the parameters of modules for existing pipelines, the pipelines themselves may be reconfigured by adding or deleting modules. For the real-time pipes (e.g., the camera pipes, or other pipes handling real-time data), the engine may include a mechanism that permits a seamless, dynamic reconfiguration of the modules comprising the camera pipes with a loss of one frame data only. For non-real-time pipes (e.g., a memory pipe), the engine may include a mechanism that permits dynamic reconfiguration with a finite stall and no frame loss.

This mechanism may be implemented using a DRAIN bit in a register and an auto-disabling START bit in the respective modules. After a finite set of frames, conditional to DRAIN=1, the modules in the pipe are disabled (by, e.g., setting the START bit to 0). The new set of modules making up the new configuration of the pipe may have the START bit set in the next programming structure.

4. Examples

Figure 9:
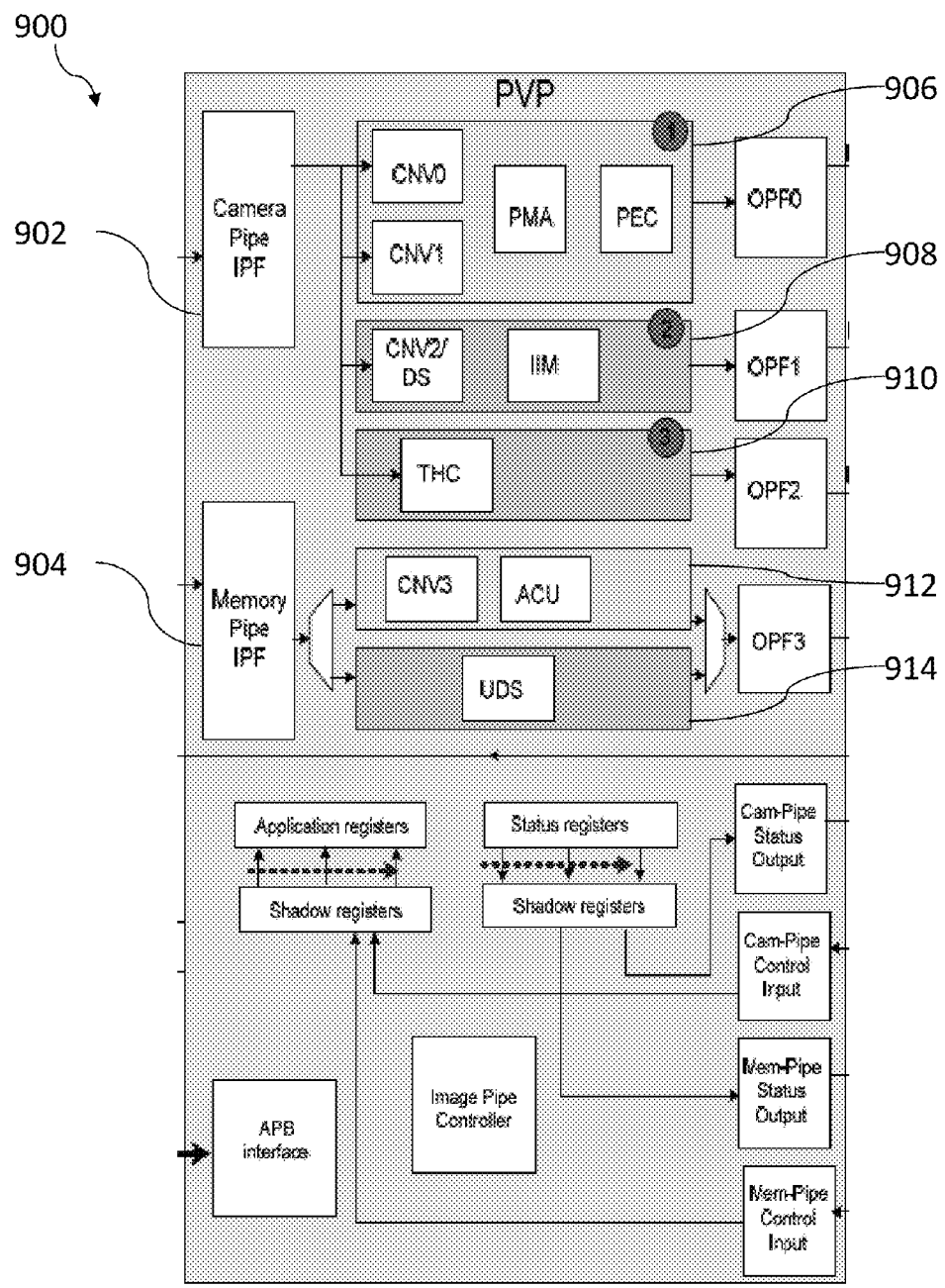
FIG. 9 is an exemplary PVP in accordance with an embodiment of the present invention.

FIG. 9 illustrates an exemplary embodiment 900 of a PVP architecture. The system includes a camera input 902 and a memory input 904. The camera input 902 feeds three camera pipelines 906, 908, 910, and the memory input 904 feeds two memory pipelines 912, 914. The first camera pipeline 906 includes two convolution/down-scaler modules, a pixel-magnitude and angle computation module, and a pixel-edge classifier module; the second camera pipeline 908 includes a convolution/down-scaler module and an integral image computation module; the third camera pipeline 910 contains a threshold, histogram, and compression module; the first memory pipeline 912 includes a convolution/down-scaler module and an arithmetic computation unit; and the second memory pipeline includes an up-down scaler.

Figure 10:
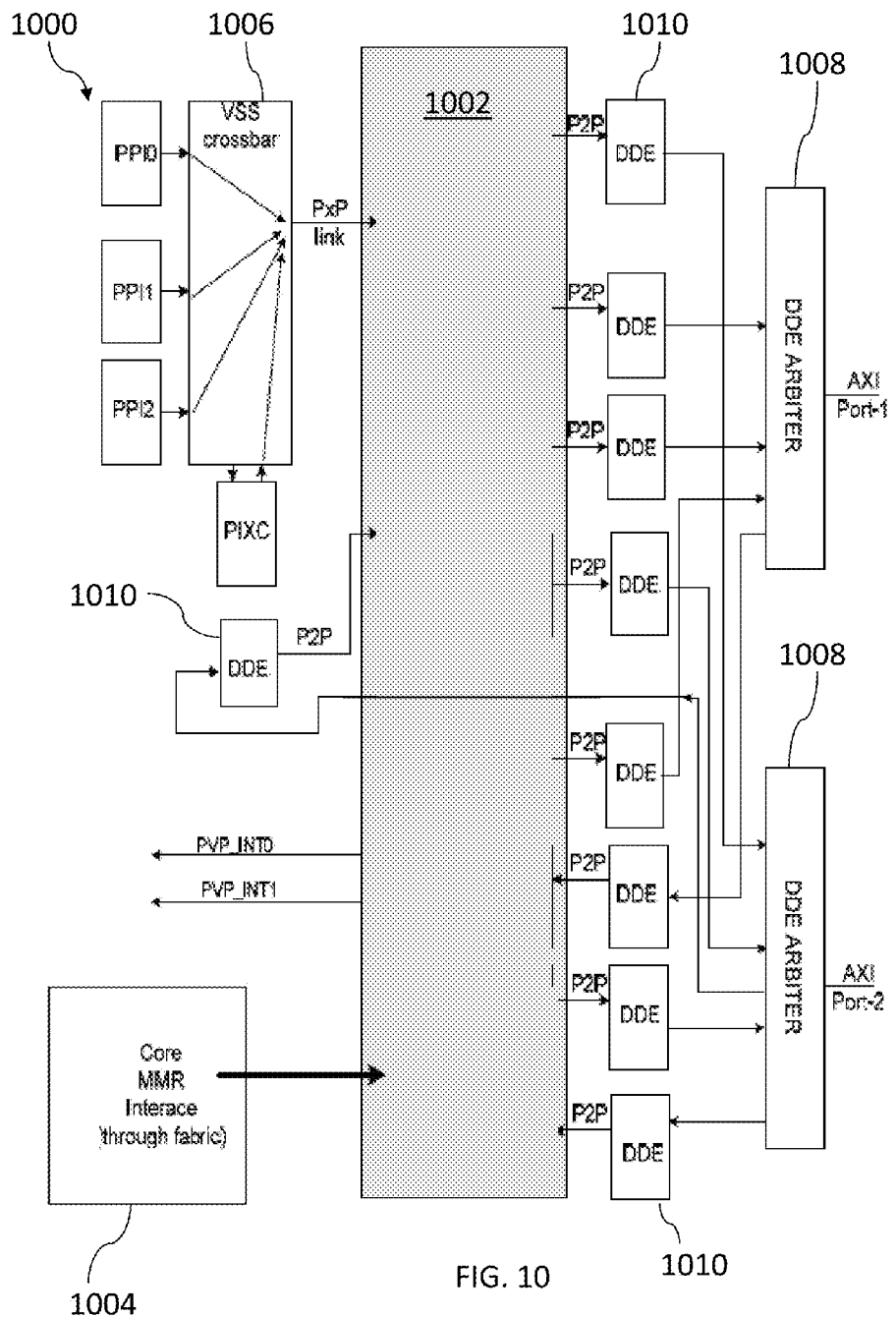
FIG. 10 is block diagram of a system incorporating a PVP in accordance with an embodiment of the present invention.

FIG. 10 illustrates a system 1000 including a PVP 1002 and its support and interface circuitry. A processor 1004 may directly control the PVP 1002 via an MMR interface. A VSS crossbar circuit 1006 provides data to the camera pipeline; the crossbar 1006 may select between a variety of input sources (e.g., PPI and PIXC inputs), thereby providing multiple camera inputs. DDE arbitration units 1008 interface with external buses (e.g., AXI buses) to allow for DMA control; DDE units 1010 off-load output data from the output-data format modules within the PVP 1002, provide input and output control and status data, and provide an input to the memory pipeline.

What is claimed is:

1. A system for configuring at least one image processing module in a pipelined pre-processor, the system comprising:
a first input port for receiving a first control signal from a processor, the first control signal comprising configuration parameters enabling the at least one image processing module to carry out a first image processing algorithm on image data processed by the at least one image processing module;
a second input port for receiving a second control signal from one or more direct-memory access ("DMA") channels, the second control signal comprising configuration parameters enabling the at least one image processing module to carry out a second image processing algorithm on image data processed by the at least one image processing module;
an arbitration unit for resolving a conflict between the first and second control signals; and
a controller for decoding the first and second control signals and configuring the at least one image processing module to carry out one of the first and the second image processing algorithms in accordance with an outcome of the arbitration unit resolving the conflict.

2. The system of claim 1, further comprising an interface for decoding the first control signal.

3. The system of claim 1, wherein the interface is an advanced peripheral bus ("APB") interface.

4. The system of claim 1, wherein the first control signal is a memory-mapped register ("MMR") input.

5. The system of claim 1, wherein the first control signal controls a first subset of image processing modules and, simultaneously, the second control input controls a second subset of image processing modules.

6. The system of claim 1, wherein the at least one image processing module is controlled by both the first and second control signals.

7. The system of claim 1, further comprising a shadow register for receiving one of the decoded first and second control signals.

8. The system of claim 7, wherein the shadow register writes an application register in the at least one image processing module to thereby apply the configuration parameters to the at least one image processing module.

9. The system of claim 1, wherein the arbitration unit stalls the second control signal in the event of a conflict.

10. A method for configuring at least one image processing module in a pipelined pre-processor, the method comprising:
receiving a first control signal from a processor, the first control signal comprising configuration parameters enabling the at least one image processing module to carry out a first image processing algorithm on image data processed by the at least one image processing module;
receiving a second control signal from one or more direct-memory access ("DMA") channels, the second control signal comprising configuration parameters enabling the at least one image processing module to carry out a second image processing algorithm on image data processed by the at least one image processing module;
resolving a conflict between the first and second control signals; and
decoding the first and second control signals and configuring the at least one image processing module to carry out one of the first and the second image processing algorithms in accordance with an outcome of resolving the conflict.

11. The method of claim 10, further comprising filling a shadow register with information derived from one of the first or second control signals.

12. The method of claim 11, further comprising configuring the at least one image processing module in accordance with the contents of the shadow register.

13. The method of claim 11, further comprising ignoring the first control signal during configuring of the at least one image processing module.

14. The method of claim 10, further comprising stalling the second control signal in the event of the conflict.

15. The method of claim 10, wherein the first control signal controls a first subset of image processing modules and, simultaneously, the second control input controls a second subset of image processing modules.

16. The method of claim 10, wherein the at least one image processing module is controlled by both the first and second control signals.

17. A digital-signal processor comprising a pipelined video pre-processor comprising at least one image processing module, the pipelined video pre-processor comprising:
a first input port for receiving a first control signal from the digital-signal processor, the first control signal comprising configuration parameters enabling the at least one image processing module to carry out a first image processing algorithm on image data processed by the at least one image processing module;

a second input port for receiving a second control signal from one or more direct-memory access ("DMA") channels, the second control signal comprising configuration parameters enabling the at least one image processing module to carry out a second image processing algorithm on image data processed by the at least one image processing module;

an arbitration unit for resolving a conflict between the first and second control signals; and a controller for decoding the first and second control signals and configuring the at least one image processing module to carry out one of the first and the second image processing algorithms in accordance with an outcome of the arbitration unit resolving the conflict.

18. The digital-signal processor of claim 17, wherein the first control signal is an MMR input and the second control signal is a DMA input.

19. The system of claim 1, wherein the controller for configuring the at least one image processing module comprises the controller for applying the configuration parameters derived from the first and second control signals to an application register of a pipeline stage of the at least one image processing module in accordance with the outcome of the arbitration unit resolving the conflict.

20. The system of claim 19, wherein the controller for applying the configuration parameters comprises the controller for providing the configuration parameters derived from the first and second control signals, in accordance with the outcome of the arbitration unit resolving the conflict, to a shadow register and for providing the configuration parameters from the shadow register to the application register.

21. The system of claim 20, wherein:
providing the configuration parameters derived from the first and second control signals, in accordance with the outcome of the arbitration unit resolving the conflict, to the shadow register comprises loading the shadow register with the configuration parameters enabling the at least one image processing module to carry out the second image processing algorithm,
providing the configuration parameters from the shadow register to the application register comprises unloading of the shadow register, and
during the loading or unloading of the shadow register, the controller prohibits control of the at least one image processing module via the first control signal.

22. The system of claim 19, wherein the configuration parameters are applied to the at least one image processing module at a time when an image frame boundary propagates through the pipeline stage of the at least one image processing module.

23. The system of claim 19, wherein:
the configuration parameters enabling the at least one image processing module to carry out the first image processing algorithm comprise a first set of coefficients of algorithmic processing carried out by the at least one image processing module, and
the configuration parameters enabling the at least one image processing module to carry out the second image processing algorithm comprise a second set of coefficients of the algorithmic processing carried out by the at least one image processing module.

24. The system of claim 23, wherein the controller for configuring the at least one image processing module comprises the controller applying the first set or second set of coefficients to the algorithmic processing carried out by the at least one image processing module.

* * * * *